United States Patent

Oshima et al.

[15] 3,657,075

[45] Apr. 18, 1972

[54] METHOD OF FABRICATING MEMORY MATRIX PLANES USING FERROMAGNETIC THIN FILM

[72] Inventors: Shintaro Oshima; Toshihiko Kobayashi, both of Tokyo-to; Tetsusaburo Kamibayashi, Kitaadachi-gun, all of Japan

[73] Assignee: Kokusai Denshin Denwa Kabushiki Kaisha, Tokyo-to, Japan

[22] Filed: Sept. 18, 1968

[21] Appl. No.: 760,529

[30] Foreign Application Priority Data

Sept. 18, 1967 Japan....................................42/59423

[52] U.S. Cl.....................................204/15, 29/625, 204/40, 340/174 TF

[51] Int. Cl.........................................C23b 5/48, C23b 5/46

[58] Field of Search ...............340/174 TF; 204/15; 117/212; 29/627

[56] References Cited

UNITED STATES PATENTS

| | | | |
|---|---|---|---|
| 3,575,824 | 4/1971 | Eide | 204/15 |
| 3,278,913 | 10/1966 | Raffel | 340/174 |
| 3,375,503 | 3/1968 | Bertelsen | 340/174 |
| 3,461,438 | 8/1969 | Chang et al. | 340/174 |

*Primary Examiner*—John H. Mack
*Assistant Examiner*—T. Tufariello
*Attorney*—Robert E. Burns and Emmanuel J. Lobato

[57] ABSTRACT

A method of fabricating a memory matrix plane using ferromagnetic thin films, in which a composite film comprising a ferromagnetic thin film, a copper layer, and a chromium layer, is deposited on a glass substrate and is photoetched so as to obtain spaced parallel lines. Ferromagnetic layers are electroplated on the separate lines to coat the copper layer, and the chromium layer together with the ferromagnetic thin film at each of the separate lines, thereby obtaining row lines. Column lines are deposited, through an insulation layer, on the row lines so as to be orthogonally arranged to the row lines by evaporative deposition or adhesive deposition.

7 Claims, 11 Drawing Figures

METHOD OF FABRICATING MEMORY MATRIX PLANES USING FERROMAGNETIC THIN FILM

Figure 1A:
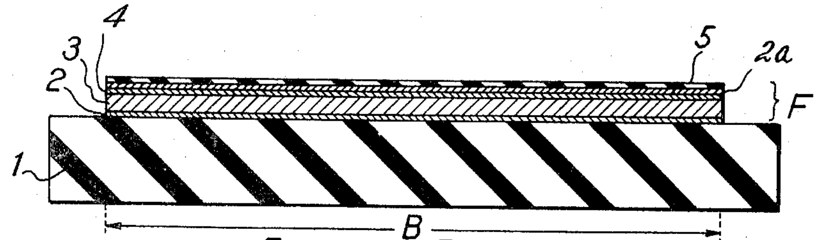

This invention relates to a new and improved method of fabricating memory matrix planes using ferromagnetic thin films.

The conventional memory matrix planes using ferromagnetic thin films are usually fabricated by (1) a process of evaporatively depositing a single layer of ferromagnetic thin film on a substratum and (2) a process of thereafter depositing row conductors and column conductors on the substratum associated with the ferromagnetic thin films. However, since the ferromagnetic film of the memory matrix fabricated by such method does not form a closed magnetic circuit at each of the memory cells, magnetic flux generated at each of the memory cells interferes seriously with the normal operation of the adjacent memory cells. Accordingly, it is very difficult to reduce the space between adjacent memory cells of the conventional memory matrix so as to increase its bit density. Moreover, since a demagnetization force is induced in the ferromagnetic thin film of each of the memory cells, when the ferromagnetic thin film does not form a closed magnetic circuit at the memory cells as in the conventional memory matrix planes, the hysteresis characteristic of the ferromagnetic thin film at each of the memory cells is deteriorated and the state of magnetization at each of the memory cells becomes unstable.

Another type of memory matrix (i.e., "twister" or "wire memory matrix") has been proposed by use of magnetic wires each comprising an elongated nonmagnetic conductive wire coated with ferromagnetic tubular film. Reliable storage devices of relatively high bit density are obtainable in such wire type memories, since the ferromagnetic tubular film forms a closed magnetic circuit in the circumference direction at each of memory cells. However, it is essential that the magnetic wires and other driving wires are arranged and fixed in a matrix formation by use of a particular fixing method (e.g., woven method or bond method, etc.). Moreover, in a wire memory, the minimum space between adjacent memory cells is relatively large, usually about 4 millimeters, due to interference between adjacent memory cells, and in view of diameters of row magnetic wires and column conductive wires.

An object of this invention is to provide a method of fabricating the memory matrix planes of extremely high bit-density in a simple and economical manner by use of ferromagnetic thin films.

Another object of this invention is to provide an improved method of fabricating such memory matrix plane of small size which is readily adaptable to mass production and automation techniques.

Figure 1B:
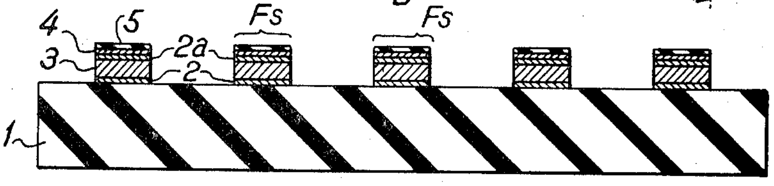
Figure 1C:
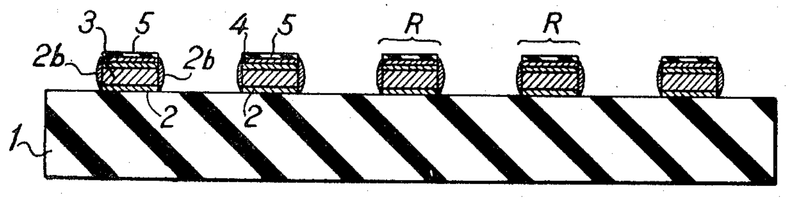
Figure 2:
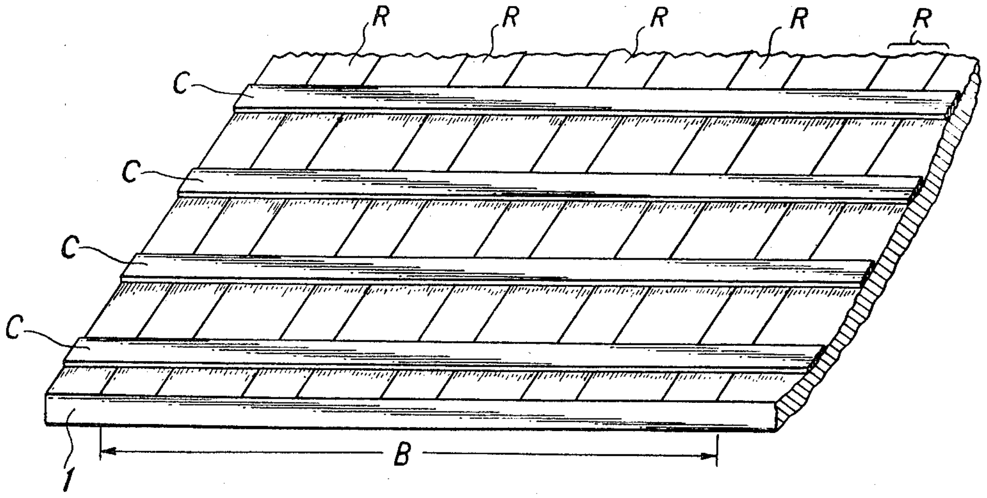
Figure 3:
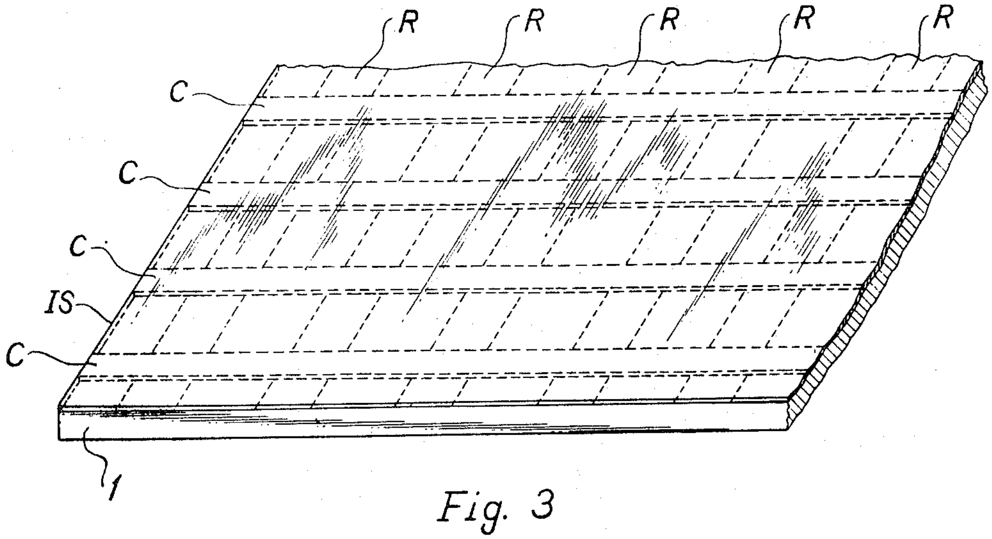
Figure 4:
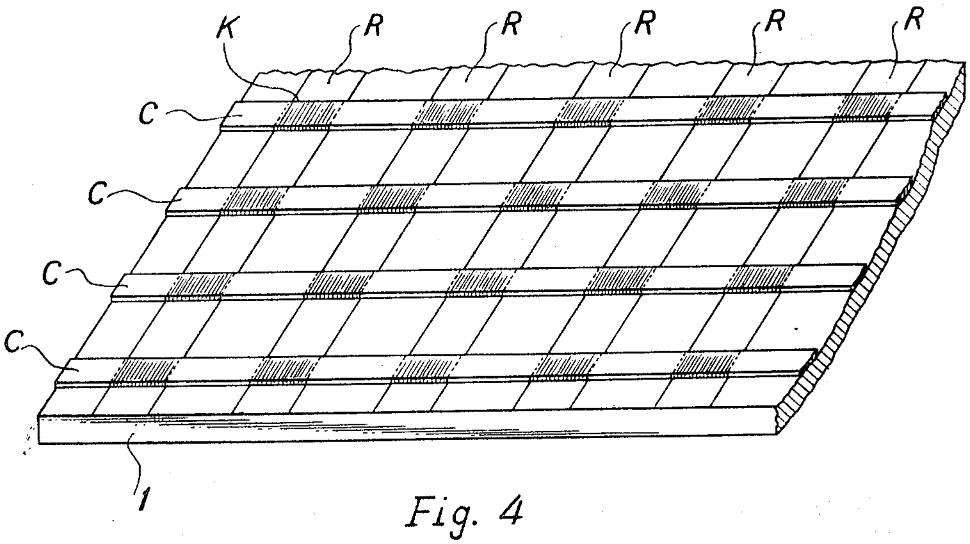

The principle of this invention will be better understood from the following more detailed discussion taken in conjunction with the accompanying drawings, in which the same or equivalent parts are designated by the same reference numerals, characters and symbols, and in which:

FIGS. 1A, 1B, and 1C are sectional views for describing an example of the method of this invention;

FIGS. 2, 3 and 4 are fragmental perspective views of memory matrix planes fabricated in accordance with the method of this invention; and FIGS. 5A, 5B, 5C, 5D and 5E are sectional views for describing another example of the method of this invention.

One embodiment of the method of fabricating the memory matrix plane in accordance with this invention comprises the following steps:

1. A process of successively depositing, within a limited area B on a smooth surfaced substratum 1 (e.g., glass) and in a vacuum chamber, a ferromagnetic thin film 2, a layer 3 of nonmagnetic conductive material, a metal layer 4 of smoothing the surface of the layer 3, and an outer ferromagnetic thin film **2*a* so as to obtain a composite film F (FIG. 1A**);

2. a process of applying a layer 5 of sensitive material for photoetching on the outer ferromagnetic thin film **2*a* (FIG. 1A**);

3. a process of exposing the composite film F to light, through a pattern mask, so as to obtain a pattern of the composite film F which comprises a plurality of separate composite films Fs arranged in parallel to one another as shown in FIG. 1B;

4. a process of chemically corroding unwanted portions of the composite film F so as to obtain the separate composite films Fs arranged in parallel as shown in FIG. 1B;

5. a process of electroplating, in an electrolytic cell, ferromagnetic layers **2*b* on the sides of the separate films Fs by employing the layer 3 of conductive material as cathode so as to obtain row lines R each coated with a tubular ferromagnetic film (FIG. 1C); and 6. a process of depositing, by evaporative or adhesive deposition through an insulation layer, parallel conductive layers (column lines C) which are orthogonally arranged to the row lines R, as shown in FIGS. 2, 3 and 4**.

In the above-mentioned steps, the ferromagnetic thin film 2 may be deposited on the substratum 1 by use of adhesives. In this case, a rolled film of ferromagnetic material (e.g., permalloy) is employed as the ferromagnetic thin film 2. In any case, it is desirable that the ferromagnetic thin film 2 has an easy magnetization axis along the section line of FIGS. 1A, 1B and 1C (i.e., perpendicular to the longitudinal direction of the row lines R) so that each of an row lines R has the easy magnetization axis in its circumferential direction.

The sensitive material 5 is generally the insulative material, so that the column lines C may be deposited on the separate films Fs.

The evaporative deposition of the column lines C is performed by use of a pattern mask so as to obtain a memory matrix as shown in FIG. 2. In the case of the adhesive deposition, if a sheet of flexible insulator IS is employed for bonding the parallel column lines C as shown in FIG. 3, the deposition of the column lines can be readily accomplished by mass production.

Moreover, if a "flux keeper" K of magnetic material is provided on the column lines C, at each of the intersections (i.e., memory cells) between the row lines R and the column lines C as shown in FIG. 4, magnetic fluxes generated from the column lines C can be substantially passed in the flux keeper K without losses at each of the memory cells.

The metal layer 4, which may be of chromium, a suitable non-magnetic metal, is employed to smooth the relatively rough surface of the conductive layer 3 (e.g., copper layer) so that the magnetic characteristic of the outer ferromagnetic thin film **2*a*** is not deteriorated.

Figure 5A:
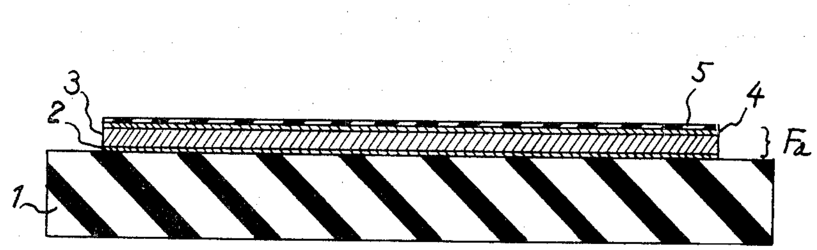
Figure 5B:
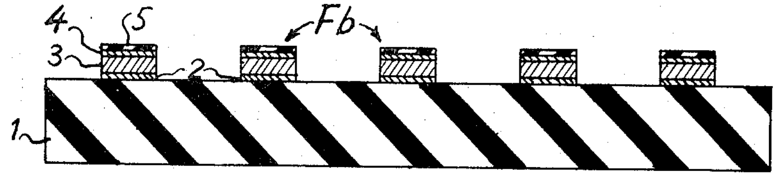
Figure 5C:
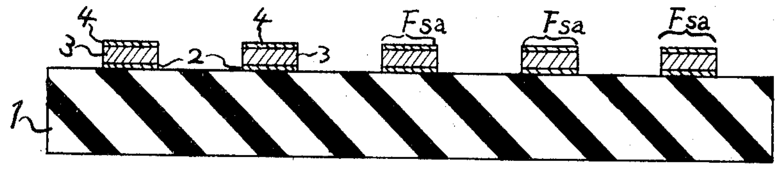
Figure 5D:
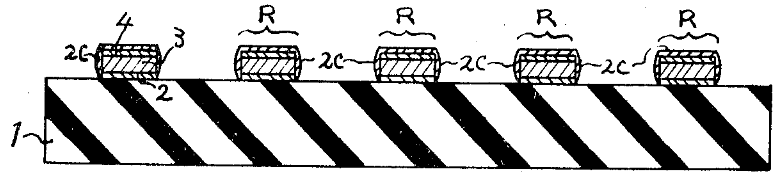
Figure 5E:
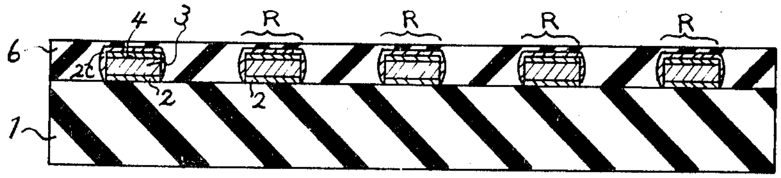

Another example of the method of this invention will be described with reference to FIGS. 5A, 5B, 5C, 5D and 5E. In this example, a composite film Fa deposited on the substratum 1 comprises a ferromagnetic thin film 2 (e.g., permalloy), a conductive layer 3 (e.g., copper), and a smoothing metal layer 4 (e.g., chromium) as shown in FIG. 5A. A layer 5 of sensitive material is applied on the composite film Fa, to photoetch it. The composite film Fa applied with the layer 5 of sensitive material, is exposed to light through a pattern mask so as to obtain a pattern of the composite film Fa which comprises a plurality of spaced composite films Fsa arranged in parallel to one another as shown in FIG. 5C. In this photoetching process, unwanted portions of the composite film F are chemically corroded so as to obtain the spaced composite films Fb arranged in parallel in FIG. 5B. After the above photoetching process, the layer 5 of sensitive material is removed as shown in FIG. 5C. The substratum 1 deposited thereon with the separate composite films Fsa is soaked in an electrolytic cell so as to electroplate ferromagnetic layers **2*c* (e.g., permalloy) on the separate films Fsa. In this case, the separate composite films Fsa are employed as cathodes. Therefore, row lines R, each coated with a tubular ferromagnetic film, are obtained as shown in FIG. 5D. An insulation layer 6 is deposited to insulate the row lines R as shown in FIG. 5E. Column lines C are then deposited in accordance with any of the types shown in FIGS. 2, 3 and 4**.

As understood from the above description, magnetic memory matrices of high bit density can be readily fabricated in accordance with this invention.

As an actual example, we have obtained a memory matrix of extremely high bit density where both of the row and column lines (R and C) have the width 30$\mu$m and are arranged at spaces of 30$\mu$m. This result indicates that the memory capacity of 500 × 500 bits by way of example can be seated within an area of 3 × 3 centimeters square.

What we claim is:

1. A method of fabricating a memory matrix plane on a smooth surfaced substratum, comprising the steps of successively depositing in a superposed relation on a substratum a ferromagnetic thin film, a layer of nonmagnetic conductive material, a metal layer for smoothing the surface of the layer of conductive material, and an outer ferromagnetic thin film so as to obtain a composite film,
   applying a layer of sensitive material for photoetching on the composite film,
   exposing the composite film to light through a pattern mask so as to obtain a pattern on the composite film which pattern comprises a plurality of spaced composite films arranged parallel to one another,
   chemically corroding unwanted portions of the composite film so as to obtain the spaced, parallel composite films,
   electroplating ferromagnetic layers on the sides of the spaced films by employing the separate composite films as cathodes so as to obtain row lines each coated with a tubular ferromagnetic film, and
   depositing, through an insulation layer, parallel conductive layers of column lines disposed orthogonally to the row lines.

2. A method of fabricating a memory matrix plane according to claim 1, in which the last mentioned steps is carried out by evaporative deposition.

3. A method of fabricating a memory matrix plane according to claim 1, in which the last mentioned step is carried out by adhesively depositing a sheet of flexible insulation for bonding the parallel column lines.

4. A method of fabricating a memory matrix plane according to claim 1, further comprising the step of affixing ferromagnetic layers on the intersections between the row and column lines, thereby providing flux keepers for the column lines.

5. A method of fabricating a memory matrix plane on a smooth surfaced substrate, comprising the steps of successively depositing in a superposed relation on a substrate a ferromagnetic thin film, a layer of nonmagnetic conductive material, and a nonmagnetic conductive metal layer for smoothing the surface of the layer of conductive material so as to obtain a composite film,
   applying a layer of photosensitive material on the composite film for photoetching,
   exposing said layer of photosensitive material to light through a pattern mask so as to obtain a pattern on the composite film, which pattern comprises a plurality of spaced exposed lines arranged parallel to one another,
   chemically corroding portions of the composite film along said exposed lines so as to obtain a plurality of spaced composite films arranged in parallel along said substrate,
   removing the remaining sensitive material,
   electroplating ferromagnetic layers on each of the spaced composite films by employing the spaced films as cathodes so as to obtain row conductor lines each coated with a tubular ferromagnetic thin film,
   depositing through an insulation layer, parallel conductive layers of column lines disposed orthogonally to the row lines, and
   affixing ferromagnetic layers on the column lines at respective intersections between the row and column lines, thereby providing flux keepers for the column lines.

6. A method of fabricating a memory matrix plane according to claim 5, in which the step of depositing said parallel conductive layers of column lines is carried out by evaporative deposition.

7. A method of fabricating a memory matrix plane according to claim 5, in which said insulation layer is adhesively deposited on said tubular ferromagnetic thin films as a sheet of flexible insulation for bonding the parallel column lines.

* * * * *